(12) United States Patent
Müller et al.

(10) Patent No.: US 12,449,045 B2
(45) Date of Patent: Oct. 21, 2025

(54) DISTRIBUTION DEVICE AND LIQUID DISTRIBUTION ACTUATOR

(71) Applicant: Vitesco Technologies GmbH, Regensburg (DE)

(72) Inventors: Marius Müller, Darmstadt (DE); Georges Maguin, Marly (FR); Konstantin Bart, Bad Nauheim (DE); Christof Heeger, Gelnhausen (DE)

(73) Assignee: Vitesco Technologies GmbH, Regensburg (DE)

( * ) Notice: Subject to any disclaimer, the term of this patent is extended or adjusted under 35 U.S.C. 154(b) by 152 days.

(21) Appl. No.: 18/501,369

(22) Filed: Nov. 3, 2023

(65) Prior Publication Data

US 2024/0059253 A1  Feb. 22, 2024

Related U.S. Application Data

(63) Continuation of application No. PCT/EP2022/062936, filed on May 12, 2022.

(30) Foreign Application Priority Data

May 17, 2021 (DE) ...................... 10 2021 204 964.8
Aug. 16, 2021 (DE) ...................... 10 2021 208 930.5

(51) Int. Cl.
*F16K 11/085* (2006.01)
(52) U.S. Cl.
CPC .................................. *F16K 11/085* (2013.01)
(58) Field of Classification Search
CPC .. F16K 11/074; F16K 11/0743; F16K 11/085; Y10T 137/86591
See application file for complete search history.

(56) References Cited

U.S. PATENT DOCUMENTS 5,848,611 A * 12/1998 Stanevich ........... F16K 11/0856
137/353
2012/0266403 A1 10/2012 Fitterer
(Continued)

FOREIGN PATENT DOCUMENTS

CN       107355564 A  * 11/2017
CN       109578625 A  *  4/2019  ............ F16K 11/085
(Continued)

OTHER PUBLICATIONS

Machine English translation of CN_107355564_A (Year: 2025).*
(Continued)

*Primary Examiner* — Hailey K. Do

(57) ABSTRACT

A distributing device D for supplying a pressurized liquid to individual cleaning locations of a vehicle. Here, the distributing device includes a housing with an electric-motor-drivable distributor arranged therein and also includes liquid-receiving and liquid-guiding means. Here, the distributor is rotatably adjustable relative to the housing into individual defined positions in which a feed connection $A_Z$ charged with liquid pressure is fluidically connected to one of multiple discharge connections $A_{RSi}$, $A_{RSi+1}$ ... $A_{RSi+n}$ for providing a supply to an associated cleaning location. Here, the distributor, which is of substantially cylindrical form, directs the liquid—according to rotational adjustment—via radially circumferential liquid-receiving and liquid-guiding means to one of the discharge connections $A_{RSi}$, $A_{RSi+1}$ ... $A_{RSi+n}$. Also proposed are a liquid-distributing actuator with such a distributing device D, and a cleaning device with such a liquid-distributing actuator, a vehicle with such a cleaning device, and an operating method.

13 Claims, 7 Drawing Sheets

(56) References Cited

U.S. PATENT DOCUMENTS

2018/0335152 A1    11/2018  Doi
2019/0136988 A1*   5/2019  Mizuno .................. B60S 1/481
2021/0179029 A1    6/2021  Yamauchi

FOREIGN PATENT DOCUMENTS

| DE | 759334 C | 5/1952 |
|---|---|---|
| DE | 2108229 A1 | 8/1972 |
| DE | 3840621 A1 | 6/1990 |
| DE | 102017129991 A1 | 6/2019 |
| DE | 102018131802 A1 | 6/2020 |
| DE | 112019003177 T5 | 4/2021 |
| DE | 112016005328 B4 | 4/2023 |
| EP | 3153361 A1 | 4/2017 |
| EP | 3388722 A1 * | 10/2018 |
| WO | 9108933 A1 | 6/1991 |
| WO | 2011072809 A1 | 6/2011 |

OTHER PUBLICATIONS

Machine English translation of CN_109578625_A (Year: 2025).*
Machine English translation of EP_3388722_A1 (Year: 2025).*
International Search Report and Written Opinion dated May 12, 2022 from corresponding International Patent Application No. PCT/EP2022/062936.
German Office Action dated Jul. 26, 2023 for corresponding German Patent Application No. 10 2021 208 930.5.

* cited by examiner

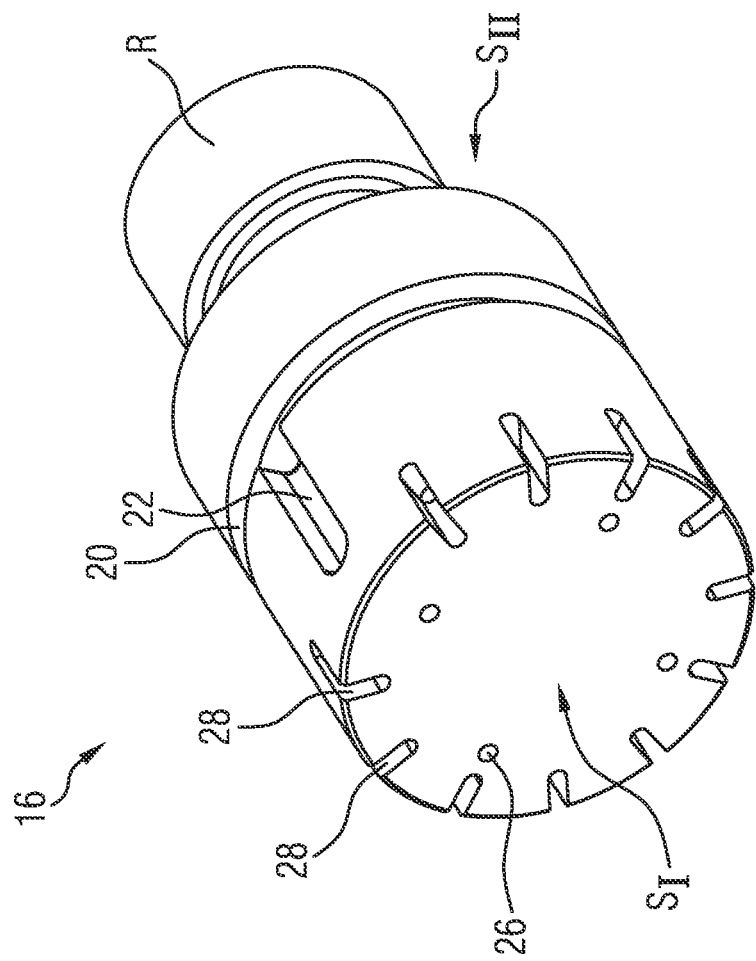

DISTRIBUTION DEVICE AND LIQUID DISTRIBUTION ACTUATOR

CROSS-REFERENCE TO RELATED APPLICATIONS

This application claims priority to PCT Application PCT/EP2022/062396, filed May 12, 2022, which claims priority to German Patent Application No. DE 10 2021 204 964.8, filed May 17, 2021, and German Patent Application No. DE 10 2021 208 930.5, filed Aug. 16, 2021. The disclosures of the above applications are incorporated herein by reference.

FIELD OF THE INVENTION

The invention relates to a distributing device for a liquid-distributing actuator and to a liquid-distributing actuator with such a distributing device.

SUMMARY OF THE INVENTION

It is an object of the invention to improve a distribution of water for a vehicle cleaning arrangement, specifically in view of the increasing number of vehicle sensors.

This object is achieved by way of a distributing device described. Furthermore, a liquid-distributing actuator with such a distributing device is also described. Furthermore, a cleaning device, a vehicle and an operating method are also described. Various embodiments of the invention are also described.

A distributing device for supplying a pressurized liquid to individual cleaning locations of a vehicle is proposed. Here, the distributing device includes a housing with an electric-motor-drivable distributor arranged therein and also includes liquid-receiving and liquid-guiding means. Here, the distributor is rotatably adjustable relative to the housing into defined positions in which a feed connection charged with liquid pressure is fluidically connected to one of multiple discharge connections for providing a supply to an associated cleaning location.

Here, the distributor is of substantially cylindrical form and directs or guides the liquid via radially circumferential liquid-receiving and liquid-guiding means—according to the orientation or rotational adjustment of the distributor with respect to a space of the housing which receives it—to the desired locations or to one of the locations or to one of the discharge connections of the distributing device and thereby to the desired cleaning locations or to one of the cleaning locations of the vehicle.

Here, these liquid-receiving and liquid-guiding means may be formed on the distributor in the form of for example a radially circumferential annular groove and a radially circumferential longitudinal groove, wherein the longitudinal groove proceeds transversely—and here for example orthogonally—from the annular groove and is thus fluidically connected thereto. The annular groove and longitudinal groove are thus provided or arranged on a circumferential side of the distributor or radially circumferentially on the distributor and opposite an assigned housing section.

This proposed water-distributing mechanism simplifies a vehicle cleaning device or a vehicle cleaning system and thus reduces the costs associated therewith, because, by way thereof, it is possible to save on liquid-conveying pumps. There is consequently also an associated weight saving. Since conveying pumps are saved on, corresponding pump activation is also simplified.

Furthermore, this proposed water-distributing mechanism reduces cleaning liquid consumption. This in turn is manifest in an increase in a range of a vehicle that is achieved as such with one filling of a cleaning liquid container or tank. This applies to future fully autonomously driving vehicles which, compared to previous vehicles, may have a significantly greater number of sensors—including safety-relevant sensors—whose functionality must be ensured.

Furthermore, the saving of required device or system components also promotes corresponding compactness of such a device or of such a system, such that overall less installation space is required.

Here, a cleaning location may be understood to refer to a cleaning location assigned to a vehicle sensor. Here, this cleaning location need not itself be part of the sensor, but may be arranged spaced apart therefrom, for example a location on a windshield or the like. The cleaning location may however also be part of a vehicle sensor, for example a cleaning location assigned to a camera. A cleaning location may however also be another location on the vehicle which is not associated with a vehicle sensor as such, for example another location on the windshield, a location on a headlight or the like.

Here, in the simplest case, a liquid or cleaning liquid may be understood to refer to water, but an aqueous cleaning agent solution, that is to say water in combination with a cleaning agent additive. Here, the cleaning agent solution may also contain an antifreeze agent, which as such lowers the freezing point of the cleaning agent solution.

Here, the distributor of the distributing device is formed without a seal with respect to the housing of the distributing device. It is therefore proposed that a return of liquid to a tank be provided. For this purpose, a connected space filled by conveyed liquid between the distributor and the housing during the operation of the distributing device is fluidically connected to a return connection of the distributing device.

During operation of the distributing device, the distributor—which as such is of substantially cylindrical form—radially circumferentially forms a defined radial gap with an associated housing part or housing section, via which radial gap conveyed liquid spreads in the housing—and over the distributor—and, in the process, radially circumferentially forms a liquid leakage film or a liquid leakage flow between the distributor and the housing part or housing section, which spaces the distributor apart from the housing. The liquid-receiving and liquid-guiding means—for example in the form of the aforementioned annular groove and longitudinal groove—provided here radially circumferentially on the distributor direct or guide the liquid to the desired locations of the distributing device, specifically to the housing part or housing section according to orientation or rotational adjustment of the distributor.

Here, some of the liquid-receiving and liquid-guiding means, on and/or in the distributor, bring about or promote or assist the return of liquid into the tank.

In one embodiment, the liquid-receiving and liquid-guiding means includes:
a first liquid channel which is provided in the housing and which—with regard to its channel cross section—is closed and which is fluidically connected to the feed connection;
a second liquid channel which is provided on the distributor and which—with regard to its channel cross section—is open and which is in the form of an annular groove into which the first liquid channel opens;
a third liquid channel which is provided on the distributor and which—with regard to its channel cross section—is open and which is in the form of a longitudinal groove which lies transversely—and here for example orthogonally—with respect to, and proceeds from, the annular groove; and a multiplicity of further, fourth liquid channels which are provided in the housing and which—with regard to their channel cross sections—are closed and which are fluidically connected in each case to one of the discharge connections and which are fluidically connectable to the longitudinal groove of the distributor as a result of a corresponding rotational adjustment of the distributor.

In a further embodiment, the liquid-receiving and liquid-guiding means includes:

first return channels in the form of liquid channels which—with regard to their channel cross sections—are closed and which are arranged in the distributor and so as to be distributed over the circumference thereof and which extend between two end faces of the distributor; and second return channels in the form of liquid channels which—with regard to their channel cross sections—are open and which are arranged on the distributor on the hydraulic connection side or in the region of the hydraulic-connection-side end face thereof, and so as to be distributed over the circumference thereof, in the form of longitudinal grooves—that is to say grooves oriented in the longitudinal direction of the distributor.

Also proposed is a liquid-distributing actuator which includes a distributing device or distribution device of the type described above and an electric motor for driving the rotatable distributor of the distributing device.

Here, the actuator may also include a control unit, as an integral constituent part within a housing section of the actuator, for activating at least the electric motor.

Here, the control unit may be arranged on the electrical-connection-side end of the actuator. It is proposed here to arrange the control unit and the electric motor in a common housing section of the actuator.

Here, the control unit may also be designed for controlling an associated liquid-conveying pump, which as such is fluidically connected to the actuator.

Also proposed is a cleaning device or a cleaning system for a vehicle for cleaning a multiplicity of cleaning locations on the vehicle, wherein the cleaning device or the cleaning system includes at least one liquid-distributing actuator of the type described above.

In addition, a vehicle having a cleaning device of the type described above is also proposed.

A vehicle is to be understood here to refer to any type of vehicle which is operated by combustion engine and/or electric motor, such as passenger motor vehicles and/or utility vehicles. These may be partially autonomously or fully autonomously operated vehicles.

Also proposed is a method for operating a distributing device or a liquid-distributing actuator of the above-described type, wherein a liquid pressure prevailing in the distributing device is reduced prior to a rotational adjustment of the distributor into one of the defined positions for supply of liquid to a liquid path associated with one of the cleaning locations, for example by way of a corresponding lowering or reduction of a rotational speed of a liquid-conveying pump which provides a liquid pressure source level.

The invention is discussed in detail below with reference to the illustrations in the figures. Further refinements of the invention emerge from the description below of the embodiments.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

In the drawings:

FIG. 7 shows a perspective view of the distributor shown in FIG. 3 and FIG. 4.

DETAILED DESCRIPTION OF THE PREFERRED EMBODIMENTS

Figure 1:
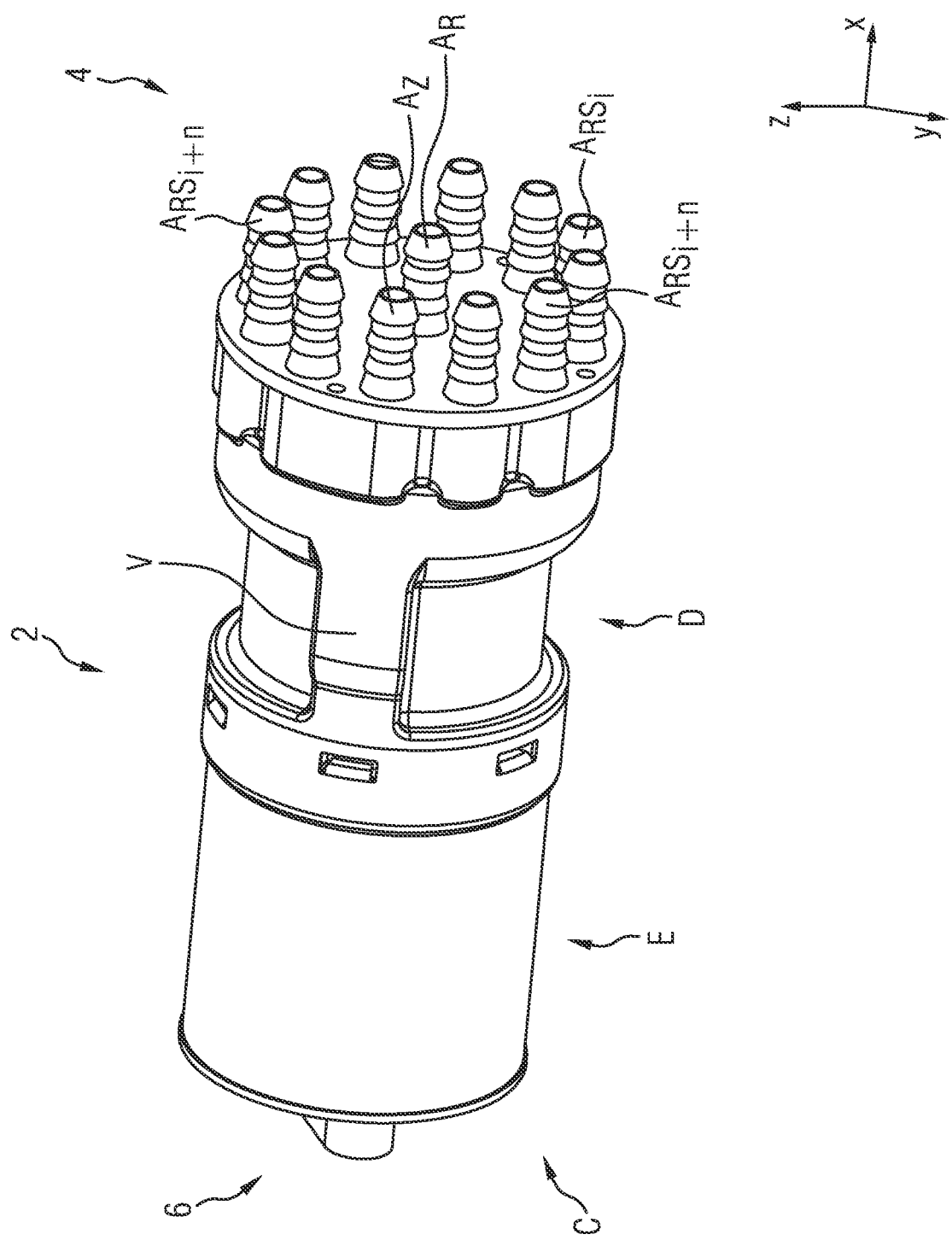
FIG. 1 shows a proposed liquid-distributing actuator in a first perspective view.
Figure 2:
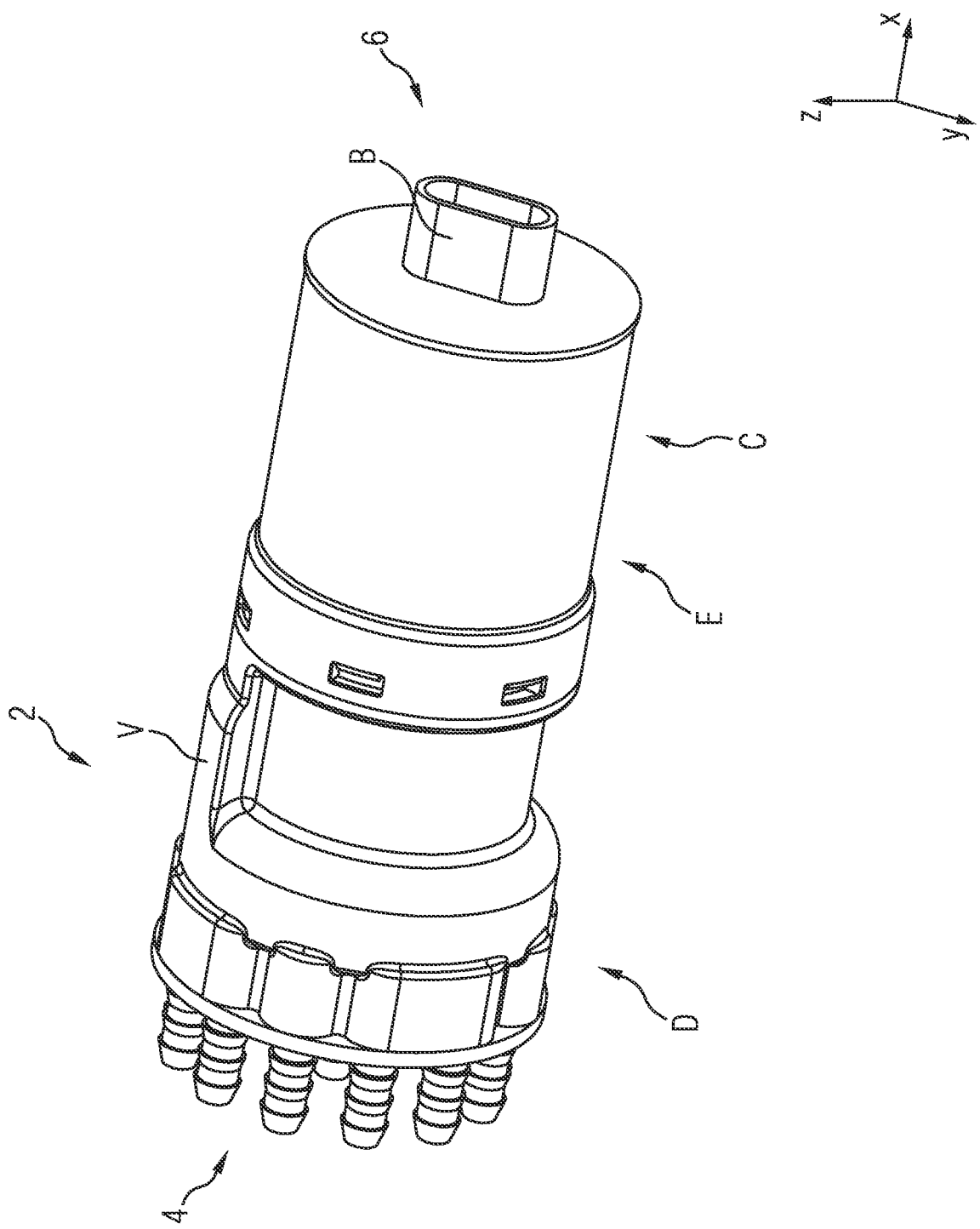
FIG. 2 shows the actuator shown in FIG. 1 in a second perspective view.

The following description of the preferred embodiment(s) is merely exemplary in nature and is in no way intended to limit the invention, its application, or uses.

The proposed liquid-distributing actuator 2 has the form of a substantially cylindrical body with a first, hydraulic-connection-side end 4, which includes a multiplicity of hydraulic connections $A_Z$ (Z=feed), $A_R$ (R=return), $A_{RSi}$, $A_{RSi+1}$ ... $A_{RSi+n}$ (RS=cleaning location), and a second, electrical-connection-side end 6 with a connection socket B.

Here, the actuator 2 is divided into three parts and includes a distributing or distribution device or a distributing section D, an electric motor or drive section E that drives the distributing device D, and a controller or control unit or a control section C for activating the electric motor E.

Here, the distributing device D includes a housing or a housing section 8, in which an electric-motor-driven or electric-motor-drivable distributor 16 is rotatably received, and also liquid-receiving and liquid-guiding means 18, 20, 22, 24$_i$, 24$_{i+1}$, ..., 24$_{i+n}$, 26, 28. Here, the distributor 16 is rotatably adjustable relative to the housing 8 into individual defined positions in order to selectively fluidically connect a feed connection $A_Z$ charged with liquid pressure to one of multiple discharge connections $A_{RSi}, A_{RSi+1}, \ldots, A_{RSi+n}$, all of which are integrally formed together with the feed connection $A_Z$ on the housing cover 12.

Here, the feed connection $A_Z$ opens into a first feed channel 18, which—with regard to its channel cross section—is closed, in the housing projection V of the distributing device D, the feed channel 18 extending in the longitudinal direction X-X of the distributing device D or of the actuator 2.

This feed channel 18 in turn opens into a second liquid channel which—with regard to its channel cross section—is open and which is in the form of a closed encircling annular groove 20, from which there proceeds a third liquid channel which—with regard to its channel cross section—is open and which is in the form of a longitudinal groove 22, which here lies transversely or for example orthogonally with respect to the annular groove 20 and likewise extends in the longitudinal direction X-X and in the direction of the hydraulic-connection-side end 4.

Here, the longitudinal groove 22 is fluidically connectable, with a corresponding rotational adjustment of the distributor 16, to a multiplicity of fourth liquid channels $A_{RSi}, A_{RSi+1} \ldots A_{RSi+n}$ which are provided in the housing 8 and which—with regard to their channel cross sections—are closed and which are associated with in each case one of the discharge connections $A_{RSi}, A_{RSi+1} \ldots A_{RSi+n}$ in order to supply pressurized liquid or cleaning liquid to individual cleaning locations of a vehicle.

The housing section 8 is, at one side on the hydraulic connection side, sufficiently sealed off by O-rings with respect to the housing cover 12 and is, at the other side on the electrical connection side, sufficiently sealed off by O-rings with respect to the housing section 10 and a containment can ST—which extends into the drive section E. The distributor 16 itself is however formed without a seal with respect to the housing section 8. This contributes to a reduction in friction, especially because no seal counteracts the rotational movement of the distributor 16 in an inhibiting manner. Consequently, an expenditure of energy for actuation of the distributor 16 is as low as possible. The reduced friction furthermore allows faster activation of the distributor 16, that is to say shorter switching times for its rotational adjustment.

Figure 3:
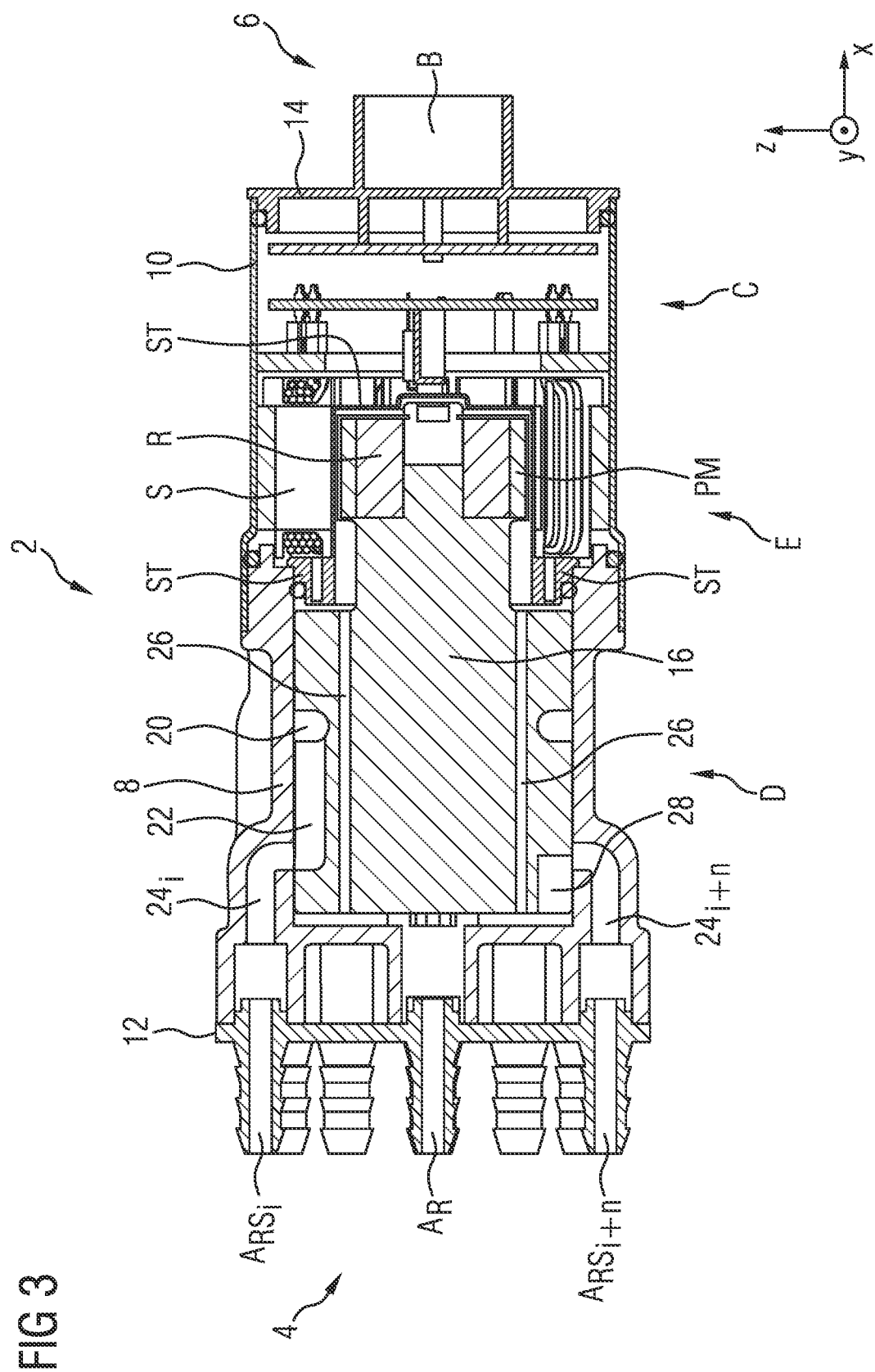
FIG. 3 shows the actuator shown in FIG. 1 and FIG. 2 in a first sectional view.
Figure 4:
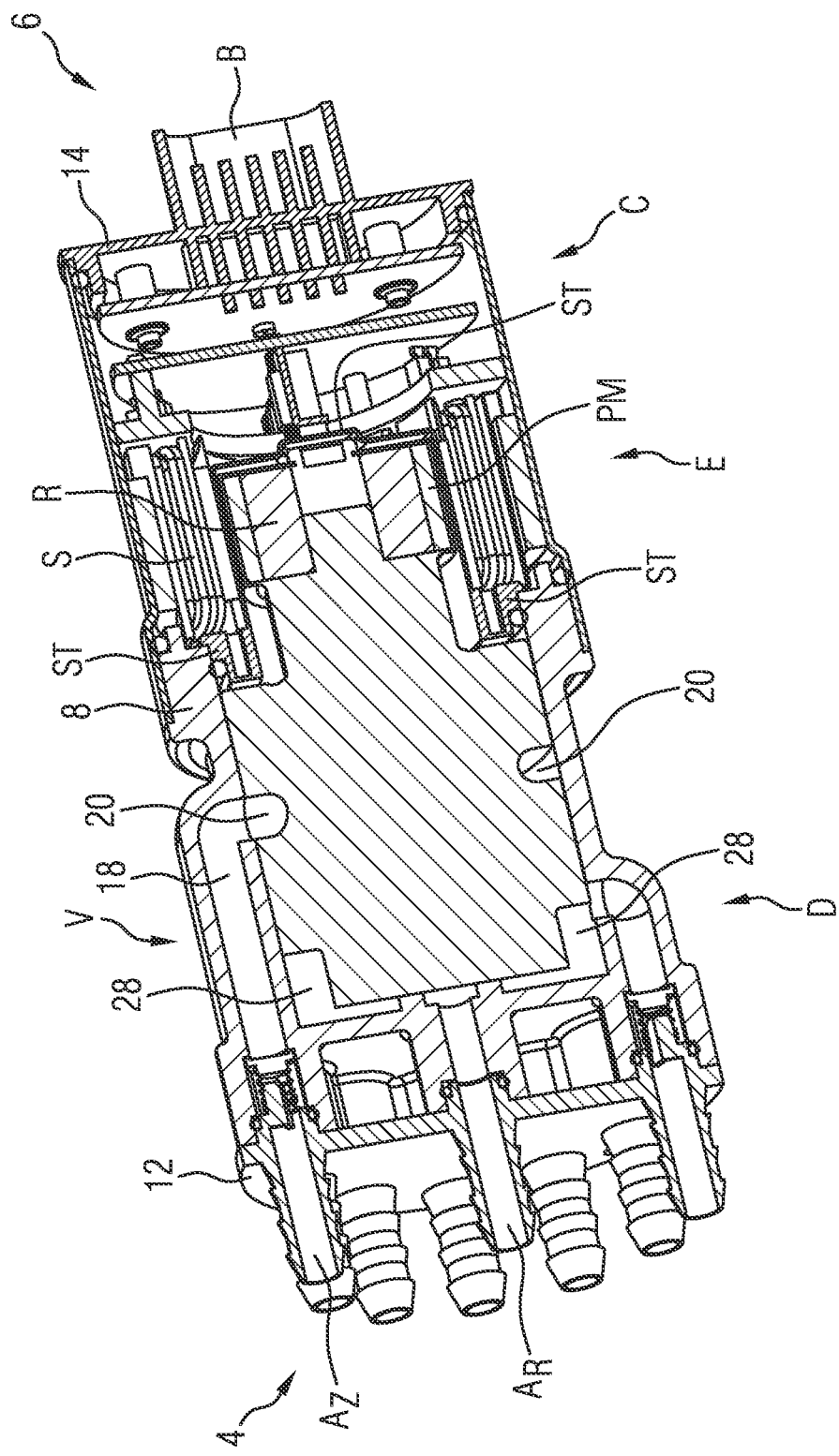
FIG. 4 shows the actuator shown in FIG. 1 and FIG. 2 in a second sectional view (slightly in perspective)
Figure 5:
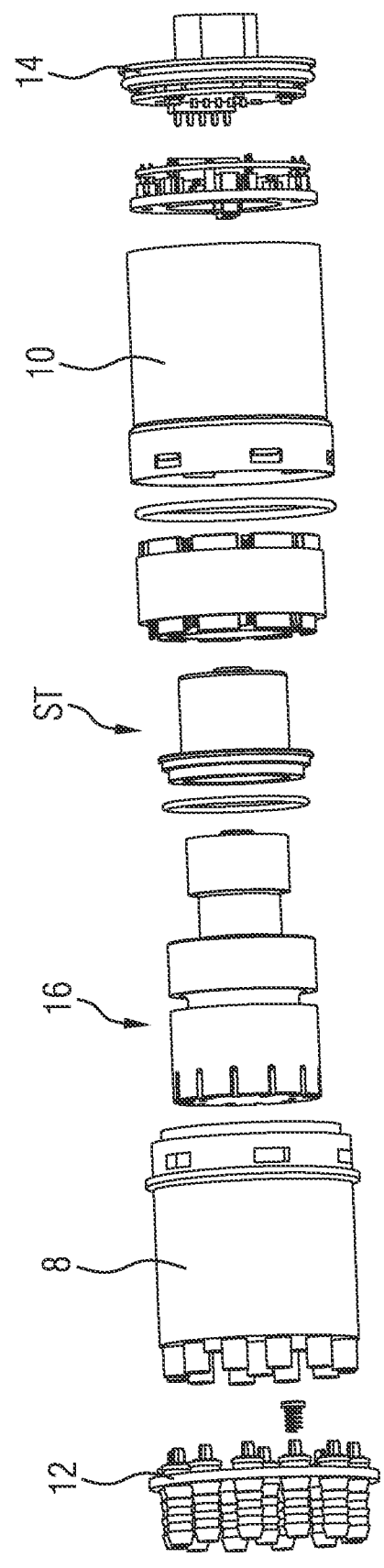
FIG. 5 shows the actuator shown in FIG. 1 and FIG. 2 in a perspective exploded view.
Figure 6:
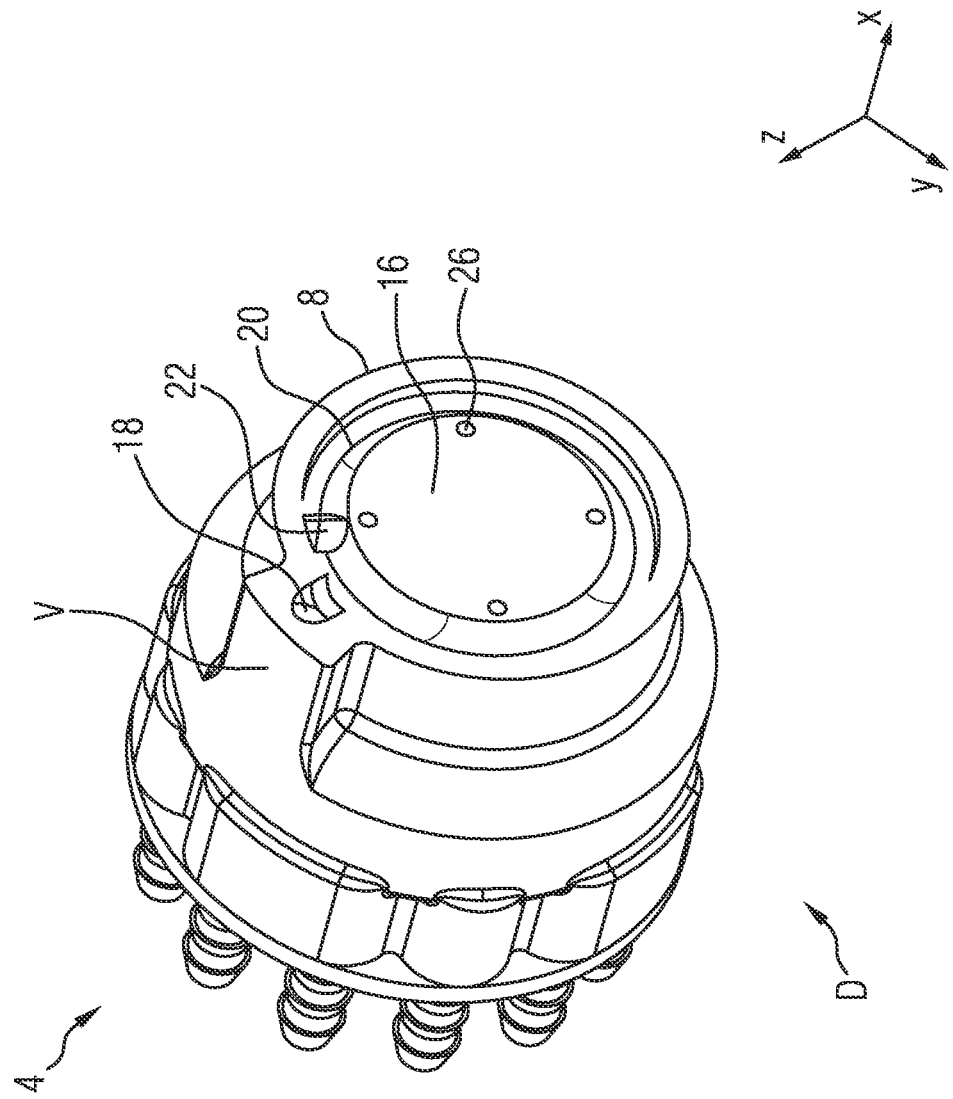
FIG. 6 shows a sectional section through the distributing section of the actuator shown in the preceding figures.

Therefore, the distributing section D is designed for a return of liquid into a tank. For this purpose, the distributor 16 includes first return channels in the form of liquid channels 26 which—with regard to their channel cross sections—are closed and which are for example in the form of drilled channels or bores and which are arranged in the distributor 16 and so as to be distributed over the circumference and which extend between the two end faces $S_I$, $S_{II}$ of the distributor 16 (see FIG. 3), and second return channels in the form of liquid channels which—with regard to their channel cross sections—are open and which are in the form of longitudinal grooves 28 which are arranged on the hydraulic connection side on the distributor 18 or in the region of the end side $S_I$ thereof and so as to be distributed over the circumference thereof. Here, these longitudinal grooves 28 form slots which extend from the end face $S_I$ into the distributor 16 (see FIG. 3 and FIG. 7).

The electric motor E, for example in the form of a brushless DC motor, includes a stator S with windings and a wet-running rotor R with permanent magnets PM that is situated to the inside of the stator. Here, an end of the distributor 16 facing the control section C bears these permanent magnets PM, which are arranged distributed over the circumference of the end, and thus forms the rotor R, which extends into the stator S. Here, the rotor R extends into the containment can ST as far as a short distance from the base thereof. Here, the containment can ST separates a wet space of the rotor R from a dry space of the stator S.

The controller C is situated at the electrical-connection-side end 6 and is an integral constituent part of the actuator 2, the controller being arranged, adjacent to the electric motor E, within a housing section 10 which is shared by the electric motor E and the controller C. A housing cover 14, on which the connection socket B is integrally formed, closes off this housing section 10 in a sufficiently sealing manner. Here, the housing cover 14 at the same time bears for example one of two provided printed circuit boards (PCBs). The other printed circuit board, on the other hand, is received by a further supporting structure, which is arranged with a small spacing to the electric motor E, within the housing section 10. Here, the housing section 10 is for example a sheet-metal shell which is connected to the housing section 8 and, here, for example clipped or crimped thereto. The housing section 8, on the other hand, just like the distributor 16 and the two housing covers 12, 14, is in an embodiment manufactured or injection-molded from a plastic.

In this exemplary embodiment, the controller C serves both for activating the electric motor E and for activating a liquid-conveying pump—not illustrated here—which provides the pressurized liquid via the feed connection $A_Z$.

The functioning of the proposed distributing mechanism is described below.

A conveying pump which is connected to the feed connection $A_Z$ of the housing cover 12 via a line—not illustrated here—feeds a liquid to the actuator 2 and in so doing generates a liquid conveying pressure of approx. 5 to 8 bar (the so-called pressure source level). Here, the conveyed liquid flows via the feed connection $A_Z$ into the feed channel 18 in the housing section 8 and via the feed channel into the encircling annular groove 20 and into the longitudinal groove 22. According to the orientation or rotational adjustment of the distributor 16, the liquid then flows through one of the liquid channels $24_i$, $24_{i+1}$, ... $24_{i+n}$ in the housing section 8 and the respectively associated discharge connection $A_{RSi}, A_{RSi+1} \ldots A_{RSi+n}$ on the housing cover 12 into a further line—not illustrated here—which leads to a cleaning location. Here, the volumetric flow rate provided by the conveying pump is for example 200 l/h.

It is proposed here that the liquid pressure in the actuator 2 is not allowed to fall to 0 bar in the electrically deenergized state of the conveying pump. Rather, the liquid pressure is held at a minimum pressure level ($0<p<p_O$), for example slightly below 2 bar ($p_O=2$ bar). In order to allow this, spring-preloaded shut-off bodies which function as valves are provided on the actuator 2 on the hydraulic connection side. Here, such a shut-off body is arranged between the individual discharge connections $A_{RSi}, A_{RSi+1} \ldots A_{RSi+n}$ and the respectively associated liquid channels $24_i$, $24_{i+1}$, ... $24_{i+n}$, for example in the form of a spring-preloaded valve plate or a spring-preloaded valve disk that shuts off the outlet of the associated liquid channel $24_i$, $24_{i+1}$, ... $24_{i+n}$ in a sufficiently sealing or liquid-tight manner for as long as the valve plate or the valve disk is not subjected to a liquid pressure greater than or equal to the minimum pressure of for example p=2 bar. These shut-off bodies or valves furthermore prevent emptying of the cleaning paths via the discharge connection $A_R$ (R=return) into the tank.

By contrast, in the electrically energized state of the conveying pump, the liquid pressure prevailing in the liquid channel $24_i$, $24_{i+1}$, ... $24_{i+n}$ that is respectively activated—via the longitudinal groove 22—is so high that the pressure spring of the associated shut-off body is overpowered, such that the liquid may flow away or flow through. By contrast, the liquid pressure respectively prevailing in the other—non-activated—channels lies below the minimum pressure of for example p=2 bar. The liquid accordingly flows only via the liquid channel $24_i$, $24_{i+1}$, ... $24_{i+n}$ actually activated via the longitudinal groove 22 and the associated cleaning path—not illustrated—to the associated cleaning location—not illustrated.

Here, this proposed distributing mechanism is combined with a return mechanism, via which a proportion of the conveyed liquid is returned to a tank—not illustrated here—and provided for renewed conveyance by the conveying pump.

Here, liquid conveyed into the annular groove 20 and the longitudinal groove 22 flows partially into the intermediate space or gap or radial gap that the distributor 16 radially circumferentially forms with the housing section 8.

This overflowing proportion of the liquid flows, on the one hand, into the wet space of the rotor R, which is thus flushed and cooled by liquid, and, on the other hand, into the collecting space in the region of the hydraulic-connection-side end of the distributor 16, which jointly delimits or forms the end face $S_I$ thereof, and from there back into the tank.

Here, the liquid that overflows from the encircling annular groove 20 into the radial gap passes, on the one hand, to the wet space of the rotor R, which jointly delimits or forms the end face $S_{II}$ of the distributor 16, and, on the other hand, to the collecting space, which—as stated—jointly delimits or forms the end face $S_I$ of the distributor 16.

By contrast, the liquid that overflows from the longitudinal groove 22 into the radial gap flows here for example at the transition point from the longitudinal groove 22 to one of the liquid channels $24_i$, $24_{i+1}$, . . . $24_{i+n}$, to the collecting space. However, liquid also flows out of the longitudinal groove 22 in the circumferential direction of the distributor 16, that is to say both clockwise and counterclockwise, into the radial gap.

During the operation of the distributing device D, it is thus the case that both radially circumferential and end-face flushing by conveyed liquid of, or flow thereof around, the distributor 16 takes place and the distributor is consequently spaced apart from the periphery surrounding it. Here, the periphery includes the housing 8 and the drive section E or the containment can ST which extends into the drive section E and in which the rotor R is flushed by liquid and thus spaced apart from the containment can ST (cf. FIG. 3).

Here, the connected space filled by conveyed liquid between the distributor 16 and its periphery is fluidically connected to the return connection $A_R$ of the distributing device D.

The above-indicated liquid source pressure (pressure source level=5 to 8 bar), which the conveying pump generates, prevails at the base of the annular groove 20 and of the longitudinal groove 22. The liquid pressure in the above-described overflowing part of the liquid is subject to various pressure gradients and, toward the return connection $A_R$, aligns with the tank pressure level, in which for example ambient pressure prevails.

Here, the individual longitudinal grooves 28 in the region of the end face $S_I$ assist the outflow of the liquid into the collecting space, via which it flows away back into the tank via a return channel, which is integrally formed for example centrally on the housing cover 12, or the discharge connection $A_R$ (R=return) having the return channel and via a line—not illustrated here—adjoining the drain connection.

From the wet space of the rotor, on the other hand, the liquid flows through the individual liquid channels 26 into the collecting space and from there—as described above—back into the tank via the discharge connection $A_R$ (R=return).

It is only upon the start-up of the actuator 2 that the distributor 16 has to overcome dry friction. Thereafter, it operates only against liquid friction.

For the operation of the actuator 2, it is proposed that the liquid pressure provided by the conveying pump be reduced temporarily, that is to say prior to a rotational adjustment of the distributor 16 into one of the desired or defined positions, to a lower pressure level of $0<p<p_Q$ (Q=source level or pressure source level)—for example through corresponding reduction of the rotational speed of the conveying pump (that is to say by rotational speed control). In this way, it is possible to attain higher adjustment speeds of the distributor 16.

Although exemplary embodiments are explained in the above description, it should be noted that numerous modifications are possible. It should be noted, furthermore, that the exemplary embodiments are merely examples which are in no way intended to limit the scope of protection, the applications, and the structure. Instead, the above description gives a person skilled in the art a guideline for the implementation of at least one exemplary embodiment, wherein various changes may be made, especially with regard to the function and arrangement of the component parts described, without departing from the scope of protection as apparent from the combinations of features equivalent thereto.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A distributing device for supplying a pressurized liquid to individual cleaning locations of a vehicle, wherein the distributing device comprises:
    a housing;
    an electric-motor-drivable distributor arranged in the housing, the electric-motor-drivable distributor being of substantially cylindrical form;
    at least one radially circumferential liquid-receiving and liquid-guiding means further comprising:
        a first liquid channel provided in the housing, the first liquid channel having a channel cross section which is closed;
        a second liquid channel provided on the electric-motor-drivable distributor, the second liquid channel in the form of an annular groove into which the first liquid channel opens, the second liquid channel having a channel cross section which is open;
        a third liquid channel provided on the electric-motor-drivable distributor, the third liquid channel in the form of a longitudinal groove such that the third liquid channel lies transversely with respect to, and proceeds from, the annular groove, the third liquid channel having a channel cross section which is open;
        a plurality of fourth liquid channels provided in the housing, each of the plurality of fourth liquid channels having a channel cross section which is closed, and each of the plurality of fourth liquid channels are fluidically connectable to the longitudinal groove as a result of a corresponding rotational adjustment of the electric-motor-drivable distributor;
    a feed connection fluidically connected to the first liquid channel; and
    a plurality of discharge connections, each of the plurality of fourth liquid channels are fluidically connected to a corresponding one of the plurality of discharge connections;
    wherein the electric-motor-drivable distributor is rotatably adjustable relative to the housing into defined positions in which the feed connection, charged with liquid pressure, is fluidically connected to one of the plurality of discharge connections for providing a supply to individual cleaning locations, and the electric-motor-drivable distributor directs the pressurized liquid, according to rotational adjustment, via the at least one radially circumferential liquid-receiving and liquid-guiding means to one of the plurality of discharge connections.

2. The distributing device of claim 1, wherein the electric-motor-drivable distributor is formed without a seal with respect to the housing.

3. The distributing device of claim 1, further comprising:
a return connection; and
a connected space fluidically connected to the return connection;
wherein, the connected space, filled by conveyed liquid between the electric-motor-drivable distributor and the housing during the operation of the distributing device, such that the distributing device is configured for a return of liquid to a tank.

4. The distributing device of one of claim 1, wherein, during operation of the distributing device, the electric-motor-drivable distributor radially circumferentially forms a defined radial gap with an associated housing section, and via the radial gap conveyed liquid spreads in the housing and over the electric-motor-drivable distributor to radially circumferentially form a liquid leakage film between the electric-motor-drivable distributor and the associated housing section, such that the liquid leakage film spaces the electric-motor-drivable distributor apart from the associated housing section.

5. The distributing device of one of claim 1, the at least one radially circumferential liquid-receiving and liquid-guiding means further comprising:
a plurality of first return channels in the form of liquid channels, each of the plurality of first return channels having a channel cross section which is closed;
wherein each of the plurality of first return channels extend between two end faces of the electric-motor-drivable distributor, and each of the plurality of first return channels is arranged in the electric-motor-drivable distributor such that the plurality of first return channels is distributed over the circumference thereof.

6. The distributing device of claim 5, the at least one radially circumferential liquid-receiving and liquid-guiding means further comprising:
a plurality of second return channels in the form of liquid channels, each of the plurality of second return channels having a channel cross section which is open;
wherein each of the plurality of second return channels is arranged on the electric-motor-drivable distributor on a hydraulic connection side, and the plurality of second return channels are distributed over the circumference thereof, in the form of longitudinal grooves.

7. A method for operating the distributing device of claim 1, comprising the step of:
reducing a liquid pressure prevailing in the distributing device prior to a rotational adjustment of the electric-motor-drivable distributor into one of the defined positions for supply of liquid to a liquid path associated with one of the individual cleaning locations.

8. The method of claim 7, further comprising the steps of:
providing a liquid-conveying pump;
effecting a pressure reduction by way of a reduction of a rotational speed of the liquid-conveying pump which provides a liquid pressure source level.

9. A liquid-distributing actuator comprising:
a distributing device of claim 1, and
an electric motor for driving the electric-motor-drivable distributor of the distributing device.

10. The liquid-distributing actuator of claim 9, further comprising:
a control unit for activating at least the electric motor;
wherein the control unit is an integral constituent part within a housing section of the liquid-distributing actuator.

11. The liquid-distributing actuator of claim 10, wherein the control unit is arranged on an electrical-connection-side end of the liquid distributing actuator.

12. The liquid-distributing actuator of claim 10, further comprising:
a common housing section;
wherein the control unit and the electric motor are arranged in the common housing section.

13. The liquid-distributing actuator of one of claims 10, wherein the control unit also controls an associated liquid-conveying pump.

* * * * *